Patented Feb. 17, 1925.

1,526,981

UNITED STATES PATENT OFFICE.

FREDERICK W. HEYL, OF KALAMAZOO, MICHIGAN, ASSIGNOR TO THE UPJOHN COMPANY, OF KALAMAZOO, MICHIGAN.

EFFERVESCENT ALKALI COMPOUND AND PROCESS OF MANUFACTURING AND PREPARING THE SAME.

No Drawing.  Application filed February 2, 1923. Serial No. 616,599.

*To all whom it may concern:*

Be it known that I, FREDERICK W. HEYL, a citizen of the United States, residing at Kalamazoo, county of Kalamazoo, State of Michigan, have invented certain new and useful Improvements in Effervescent Alkali Compounds and Processes of Manufacturing and Preparing the Same, of which the following is a specification.

This invention relates to effervescent alkali compounds and the process of manufacturing and preparing the same.

Under ordinary circumstances it is known that lime salts in solutions are precipitated by an addition of sodium bicarbonate so that where the two bases have been admixed such medication has been carried out by the use of two or more individual pharmaceutical preparations. Most lime salts have a disagreeable taste so that medication has in the past been carried out disadvantageously with lime salts in compressed tablets. Where it has been attempted to meet the requirement to administer lime salts in solutions, the use of naturally occurring alkaline waters has been found deficient.

The objects of this invention are, first, to provide an improved effervescent salt compound capable of forming a solution embracing soluble lime to be administered simultaneously with massive doses of sodium bicarbonate.

Second, to provide an improved process of manufacturing such a salt.

Third, to provide an improved effervescent salt capable of carrying basic soluble salts effectively in solution without precipitation.

In the effervescent compound of my invention the relation of the dose of sodium bicarbonate to the lime salt (e. g. calcium lactate) may be varied within rather wide limits, but is practical in the ratio of 5 to 1 respectively. The solution of the salt when dissolved and allowed to effervesce is characterized by its palatability. In this effervescent alkaline compound use is made of the solvent influence of freshly surcharged carbonic water to hold the lime in solution. This can be accomplished only by limiting the relationship of the lime salt to the sodium bicarbonate within well defined ratios. Also, the preparation must be so made that a vigorous generation of carbonic dioxide ensues when the effervescent powder is dissolved in water.

This involves a special method of manipulation to prevent the formation of insoluble calcium or other alkaline earth carbonate in the process of manufacture. In the following example I give an illustrative method for carrying out the invention. This may of course be varied within limitations without departing from the fundamental spirit of the invention.

To produce the granular effervescent alkaline compound containing sodium bicarbonate and calcium lactate, I take by weight dry citric acid 25 parts, dry tartaric acid 15 parts, dry sodium bicarbonate 67.8 parts, potassium bicarbonate 1 part, calcium lactate 5 parts, along with small additional parts of sodium chloride, magnesium sulphate or lactate, and sodium phosphate. The quantities of magnesia, phosphoric acid, chlorine, potash and lime may be calculated to approximate the relative proportions of these elements in the blood or serum. Thus the alkalies administered are balanced and on a rational basis related to the basal requirements of the body.

The alkaline ingredients are mixed and the organic acids are added. The mixture is rapidly moistened with a suitable relatively unreactive organic medium, e. g. 95% alcohol. It is immediately conveyed to a vacuum drier which has been previously heated to 50 degrees centigrade. After the mass has assumed a proper consistency it is broken to granular condition and returned to the vacuum and desiccated. The loss in carbon dioxide is limited and with proper manipulation amounts to less than 15% of the calculated amount. Unless this is effectively controlled by prompt manipulation, much larger losses of carbon dioxide ensue with consequent untoward effect upon the solubility of the lime salt.

The dried effervescent granules are immediately packaged in sealed, air tight containers.

When this effervescent salt is added to the water, there is a strong surcharge of carbonic acid gas which insures the complete solution particularly of the lime salts and all others, giving a perfectly clear palatable solution for administration.

I have indicated variations of proportions possible, and there are also variations in the process which are permissible. I desire to claim the compound broadly and specifically, as well as the process of manufacturing, and also desire to claim the process of surcharging with carbonic acid gas to insure the solution of the lime.

Having thus described my invention, what I claim as new and desire to secure by Letters Patent is:

1. An effervescent compound comprising a mixture of sodium bicarbonate and calcium lactate in the proportion of 21 to 4½, additional sodium bicarbonate in the proportion of 46.8 parts to 15 parts of tartaric acid and 25 parts of citric acid, the proportions being such that the sodium bicarbonate reacts with the tartaric acid when dissolved and discharges a large volume of carbonic acid gas to dissolve the calcium lactate in a solution of bicarbonate of soda.

2. In an effervescent salt, the combination of a proportion as large as 5 to 1 of sodium bicarbonate and calcium lactate, with reagent acids to insure a surcharge of carbonic acid gas to dissolve the calcium lactate.

3. The process of preparing an effervescent salt consisting of admixing sodium bicarbonate and calcium lactate in the proportions of at least 5 to 1, with a mixture of tartaric acid and citric acid, with sodium bicarbonate sufficient to react therewith, moistening the same with an unreactive organic medium such as 95% alcohol, drying the same in vacuum at 50 degrees centigrade, reducing the mass to granular condition, completely desiccating the same and enclosing in hermetically sealed packages, as specified.

4. The process of preparing an effervescent salt consisting of admixing sodium bicarbonate and calcium lactate in the proportion of at least 5 to 1, with a mixture of tartaric acid and citric acid, with sodium bicarbonate sufficient to react therewith, moistening the same with an unreactive organic medium, drying the same in vacuum at 50 degrees centigrade, reducing the mass to granular condition, completely desiccating the same, and enclosing in hermetically sealed packages, as specified.

In witness whereof, I have hereunto set my hand and seal.

FREDERICK W. HEYL. [L. S.]